United States Patent [19]

De Vito

[11] Patent Number: 4,934,841
[45] Date of Patent: Jun. 19, 1990

[54] POLYMER CAGE FOR RADIAL BEARING

[75] Inventor: E. F. De Vito, Torrington, Conn.

[73] Assignee: The Torrington Company, Torrington, Conn.

[21] Appl. No.: 282,511

[22] Filed: Dec. 12, 1988

[51] Int. Cl.⁵ .................. F16C 33/46; F16C 33/56
[52] U.S. Cl. .............................. 384/572; 384/576
[58] Field of Search ........... 384/470, 472, 571, 572, 384/576, 580

[56] References Cited

U.S. PATENT DOCUMENTS

| | | | |
|---|---|---|---|
| 2,219,031 | 10/1940 | Frauenthal et al. | 384/572 |
| 2,380,327 | 7/1945 | Parsons | 384/470 |
| 3,350,147 | 10/1967 | Hingley | 384/472 |
| 4,192,560 | 3/1980 | Hartnett | 384/572 |
| 4,208,078 | 6/1980 | Miki | 384/572 |
| 4,222,620 | 9/1980 | Mirring | 384/576 |
| 4,317,601 | 3/1982 | Faigley, Jr. | 384/576 |
| 4,787,757 | 11/1988 | Finger | 384/470 |

FOREIGN PATENT DOCUMENTS 1390496 4/1975 United Kingdom .............. 384/572

Primary Examiner—Thomas R. Hannon
Attorney, Agent, or Firm—Frank S. Troidl

[57] ABSTRACT

A polymer cage of this invention comprises two annular end rims connected by multiple crossbars. This cage can be used in conjunction with metallic roller elements and bearing components to provide an improved wheel radial bearing. The cage is designed to provide improved lubricant flow through the bearing, and the cage can be manufactured by axial draw molding techniques.

5 Claims, 1 Drawing Sheet

POLYMER CAGE FOR RADIAL BEARING

This invention relates to radial bearings which utilize a cage in order to limit radial motion of the roller elements; more particularly, it relates to polymer cages for bearings used in automotive applications. This invention is particularly well-suited for use in heavy duty radial roller bearings, and more specifically, for use in automotive radial wheel bearings.

Prior art patents disclose polymer cages having upper and lower side rails which support a plurality of crossbars. These side rails and crossbars define multiple pockets which separate and/or limit radial motion of the roller elements of the bearing. Examples of this type of prior art include U.S. Pat. No. 3,881,790 for a "One Piece Molded Plastic Retainer For Cylindrical Roller Bearings And Method Of Manufacture" issued in the name of Robert M. Ryanen on May 6, 1975, and U.S. Pat. No. 4,723,645 for a "Polymeric Cage For Overrunning Clutch" issued in the name of Jurgen Rabe on Feb. 9, 1988, and U.S. Pat. No. 4,623,270 for a "Pocket Cage For Rolling Bearing" issued in the names of Armin Olschewski, Bernard Bauer, Hilmar Leuner, and Herbert Dobhan on Nov. 18, 1986.

One of the main problems with the prior art is that the lubricant flow through and around the bearing and its components is often inadequate. This is caused by various factors, such as flow restrictions caused by the proximity of the crossbars to the roller elements. In addition, the proximity of the side rails to the roller elements and the inner and outer races may aggravate the lubrication problem. Lubrication problems tend to be accented in application requiring larger bearings which must support greater loads. Inadequate lubricant flow results in poorer performance of the bearings and shortens their useful lives considerably.

The cage of the present invention overcomes these problems with crossbars having a structural design which allows for increased lubricant flow. The design also provides for crossbars having enhanced structural integrity.

Briefly described, the cage of this invention comprises two end rims connected by multiple crossbars. The entire cage is made from a polymer material which may be reinforced with fiberglass and/or carbon fiber to provide additional structural integrity for specific applications. The cage is designed for an axial draw type molding tool in order to minimize mold tooling costs.

This invention may be better understood by reference to the following detailed description and drawings in which.

In the various figures, like parts are referred to by like numbers.

Figure 1:
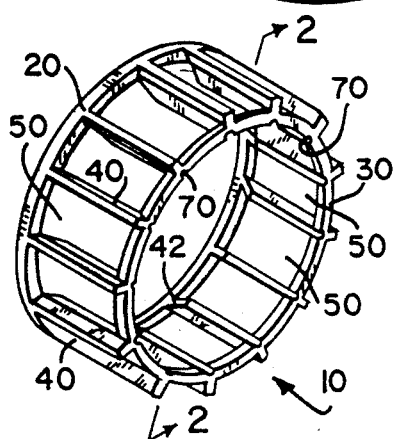
FIG. 1 is an isometric view of the preferred embodiment of the cage of the present invention.

Referring to the drawings, and more particularly to FIG. 1, a cage 10 comprises two end rims 20 and 30 which are connected by multiple crossbars 40. Top end rim 20 and bottom end rim 30 and the crossbars 40 define pockets 50 which limit radial and circumferential motion of roller elements 60 (see FIG. 6). The cage 10 is made of a polymer material in order to minimize manufacturing costs. For specific applications requiring additional structural integrity, fiberglass and/or carbon fibers may be added to the cage material to provide the needed strength. In addition, the end rims 20 and 30 and the crossbars 40 must have dimensions large enough to provide the cage with adequate structural strength for specific applications, e.g., radial bearings used for wheel bearings.

Figure 3:
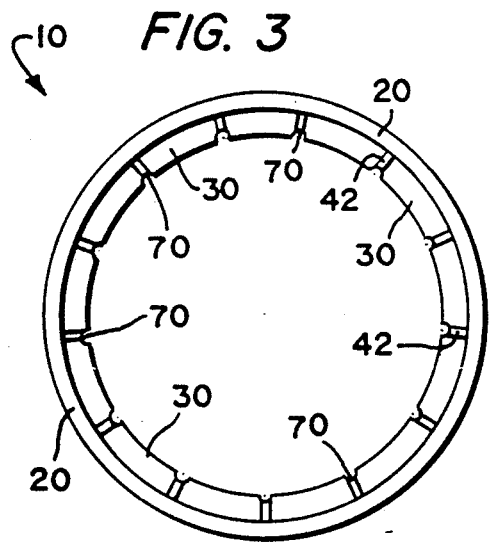
FIG. 3 is an axial view of the cage of FIG. 1, taken along line 3—3 of FIG. 2.
Figure 4:
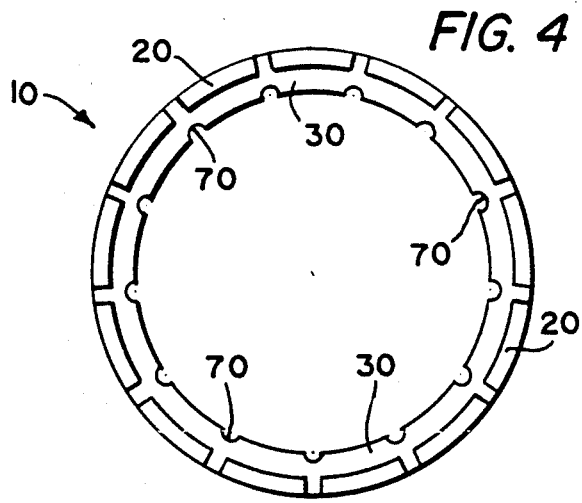
FIG. 4 is an axial view of the same cage from the end opposite the end shown in FIG. 3.
Figure 5:
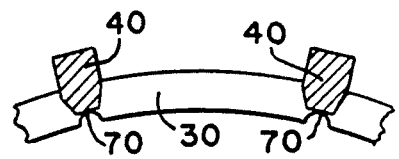
FIG. 5 is an enlarged fragmentary view of a small arc of the same cage, with a sectional view of two of the crossbars, taken along line 5—5 of FIG. 2.

Turning now to FIGS. 2-5, the side sectional view and the axial views illustrate several unique aspects of the construction of the cage of this invention. First of all, a tapered edge 42 is located on one axial end of each cross-bar 40. Each edge 42 is positioned on the inner radial surface of the crossbar, and is tapered from a radial width equal to the main crossbar width to a point which connects to the outer axial edge of top end rim 20 (see FIG. 2). Secondly, bottom end rim 30 has a plurality of flutes 70 in its inner radial surface. Each flute 70 is positioned in circumferential alignment with a crossbar 40, adjacent to the connection between rim 30 and crossbar 40. Each flute has a semicircular configuration, as depicted in FIGS. 3-5. The flutes could have other configurations; the only limitation on the shape of a flute is that it provide for adequate lubricant flow through the bottom end rim 30. Thirdly, an examination of FIG. 2 discloses that the inner diameter of each crossbar 40 is relatively larger than the inner diameter of bottom end rim 30. These design features result in improved bearing performance over the prior art, since they all tend to increase lubrication flow through the bearing. Testing conducted by this inventor indicates that radial bearings which are used with heavy loads must have one or more of these features in order to ensure adequate lubricant flow and thereby provide acceptable performance.

Figure 6:
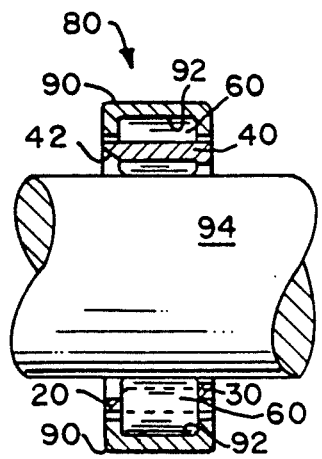
FIG. 6 is a side sectional view of a radial bearing assembly which incorporates the cage of FIG. 1 and multiple rolling elements, surrounding a shaft or axle.

As shown in FIG. 6, the relative positions of the various components of the bearing assembly 80 ensure that adequate clearances exist to provide the lubricant flow required through the bearing. The axial movement of each roller 60 is limited by an outer ring 90 which also provides an outer raceway 92 on its inner radial surface. The bearing assembly 80 is press fitted into a housing (not shown), and a shaft or axle 94 is positioned inside the bearing. The outer surface of the shaft or axle provides the inner raceway for the rollers 60. The lubricating oil flows into the cage assembly through flutes 70, or past tapered edges 42, and lubricates the roller elements 60 and the inner and outer raceways. The oil can easily flow from one pocket 50 to another by passing over and under the crossbars 40, through the clearances shown in FIG. 6. The oil then passes out of the cage assembly axially past tapered edges 42 or through flutes 70.

Figure 2:
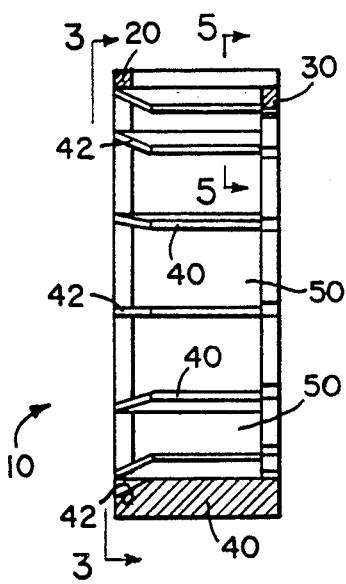
FIG. 2 is a radial sectional view of the cage shown in FIG. 1, taken along line 2—2 of FIG. 1.

Another feature of the cage of this invention is that it can be manufactured relatively inexpensively, because the cage design allows the use of axial draw mold tooling. It should be noted that radial molding techniques could also be used, even though the axial draw method is preferred. As can be seen in FIGS. 1, 2 and 6, the top end rim has a greater diameter than the bottom end rim. The diameters of the two rims are such that the outer diameter of bottom rim 30 is nearly equal to the inner diameter of the top rim 20. This allows the bottom rim to be molded in the inner portion of the axial draw molding tool, while the top end rim can then be molded in the outer portion of the axial draw molding tool.

I claim:

1. For use with a non-tapered roller radial bearing, a polymer bearing cage comprising:
   a top annular end rim having an outer radial surface and an inner radial surface, an outer diameter and an inner diameter, and a first outer axial end and a second inner axial end;
   multiple crossbars attached to said top end rim, each of said crossbars having an outer radial surface and in inner radial surface, said radial surfaces defining an outer diameter and an inner diameter;
   a bottom annular end rim attached to and axially spaced from said top end rim by said multiple crossbars, said bottom rim having an outer radial surface and an inner radial surface, and having an outer diameter and an inner diameter; and
   multiple flutes formed in said inner radial surface of said bottom end rim,
   said crossbar inner radial surface, said edge beginning at a point connected to said first axial edge of said inner radial surface of said top end rim, and ending at a point intermediate said top and bottom rims and near said bottom inner radial surface inner diameter being greater than that of said bottom end rim, and said top end rim inner diameter being substantially the same as the outer diameter of said bottom end rim.

2. A cage according to claim 1 wherein each of said crossbars has a tapered edge on said inner radial surface, said edge beginning at a point connected to said first axial end of said inner radial surface of said top end rim, and ending at a point intermediate said top and bottom rims and near said top rim.

3. For use with a radial bearing, a polymer cage-and-roller assembly comprising:
   a top annular end rim having an outer radial surface and an inner radial surface, an outer diameter and an inner diameter, and a first outer axial end and a second inner axial end;
   multiple crossbars attached to said top end rim, each of said crossbars having an outer radial surface and an inner radial surface, said radial surfaces defining an outer diameter and an inner diameter;
   a bottom annular end rim attached to and axially spaced from said top end rim by said multiple crossbars, said bottom rim having an outer radial surface and an inner radial surface, and having an outer diameter and an inner diameter;
   multiple flutes formed in said inner radial surface of said bottom end rim;
   a plurality of pockets defined by said crossbars and said top and bottom end rims; and
   multiple non-tapered roller elements whose circumferential and radial motion are limited by said pockets,
   each of said crossbars having a tapered edge on said inner radial surface, said edge beginning at a point connected to said first outer axial end of said inner radial surface of said top end rim, and ending at a point intermediate said top and bottom rims and near said top rim, and
   said crossbar inner radial surface inner diameter being greater than that of said bottom end rim, and said top end rim inner diameter being substantially the same as the outer diameter of said bottom end rim.

4. A radial bearing assembly comprising:
   an outer ring having an outer radial surface and an inner radial surface, said inner radial surface providing an outer raceway for said bearing assembly;
   multiple non-tapered roller elements positioned in said outer ring so as to make rolling contact with said outer raceway; and
   a polymer cage for limiting circumferential and radial motion of said roller elements, said cage comprising:
   (a) a top annular end rim having an outer radial surface and an inner radial surface, an outer diameter and an inner diameter, and a first outer axial end and a second inner axial end;
   (b) multiple crossbars attached to said top end rim, each of said crossbars having an outer radial surface and an inner radial surface, said radial surfaces defining an outer diameter and an inner diameter;
   (c) a bottom annular end rim attached to and axially spaced from said top end rim by said multiple crossbars, said bottom rim having an outer radial surface and an inner radial surface, and having an outer diameter and an inner diameter; and
   (d) multiple flutes formed in said inner radial surface of said bottom end rim,
   each of said crossbars having a tapered edge on said inner radial surface, said edge beginning at a point connected to said first outer axial end of said inner radial surface of said top end rim, and ending at a point intermediate said top and bottom rims and near said top rim, and
   said crossbar inner radial surface inner diameter being greater than that of said bottom end rim, and said top end rim inner diameter being substantially the same as the outer diameter of said bottom end rim.

5. A bearing assembly according to claim 4, wherein each of said crossbars has a tapered edge on said inner radial surface, said edge beginning at a point connected to said first outer axial end of said inner radial surface of said top end rim, and ending at a point intermediate said top and bottom rims, near said top rim.

* * * * *